United States Patent
Shimokawa et al.

(10) Patent No.: US 6,168,719 B1
(45) Date of Patent: Jan. 2, 2001

(54) METHOD FOR THE PURIFICATION OF IONIC POLYMERS

(75) Inventors: Keishi Shimokawa; Takuya Imaki; Jun Shida; Naoki Nojiri; Shinobu Hiramatsu, all of Wakayama (JP)

(73) Assignee: Kao Corporation, Tokyo (JP)

( * ) Notice: Under 35 U.S.C. 154(b), the term of this patent shall be extended for 0 days.

(21) Appl. No.: 09/331,198

(22) PCT Filed: Dec. 22, 1997

(86) PCT No.: PCT/JP97/04775

§ 371 Date: Jun. 25, 1999

§ 102(e) Date: Jun. 25, 1999

(87) PCT Pub. No.: WO98/29459

PCT Pub. Date: Jul. 9, 1998

(30) Foreign Application Priority Data

Dec. 27, 1996 (JP) .................................................. 8-357899

(51) Int. Cl.[7] ...................................................... B01D 61/00
(52) U.S. Cl. ........................ 210/652; 210/651; 210/908; 210/690
(58) Field of Search ................................... 210/652, 651, 210/690, 500.25, 908; 528/480

(56) References Cited

U.S. PATENT DOCUMENTS

| 5,055,197 | 10/1991 | Albright et al. . | |
|---|---|---|---|
| 5,354,945 | * 10/1994 | Detering et al. | 210/651 |
| 5,954,967 | * 9/1999 | Egraz | 210/651 |

FOREIGN PATENT DOCUMENTS

| 0 767 212 | 4/1997 | (EP) . | |
|---|---|---|---|
| WO 88/05444 | * 7/1988 | (WO) | 210/651 |

OTHER PUBLICATIONS

Patent Abstract of Japan, JP 8–217802, Aug. 27, 1996.

* cited by examiner

Primary Examiner—Ana Fortuna
(74) Attorney, Agent, or Firm—Oblon, Spivak, McClelland, Maier & Neustadt, P.C.

(57) ABSTRACT

To provide a method for purification of the ionic polymer compound comprising efficiently removing low-molecular impurities, for example, ionic remaining monomers, which are charged identically to the ionic polymer compound from the ionic polymer compound in a shorter period of time. A method for purification of an ionic polymer compound, characterized by removing low-molecular impurities, such as ionic remaining monomers, by the use of an ultrafiltration membrane and/or a reverse osmosis membrane from an aqueous solution containing the ionic polymer compound and low-molecular impurities which are charged identically to the ionic polymer compound, under conditions that a concentration of the ionic polymer compound is from 7 to 20% by weight, and that an amount of charges of the ionic polymer compound in the aqueous solution is 0.30 gram-equivalent/liter or more.

10 Claims, No Drawings

METHOD FOR THE PURIFICATION OF IONIC POLYMERS

TECHNICAL FIELD

The present invention relates to a method for purification of an ionic polymer compound, and more specifically to a method for purification comprising efficiently removing ionic low-molecular impurities such as remaining monomers from the ionic polymer compound.

BACKGROUND ART

In general, when low-molecular impurities are separated and removed from polymer compounds, in many cases separation and removal are carried out by volatilization. However, in a case where the low-molecular impurities are ionic, as in the case of electrolytes, in many cases such low-molecular impurities are non-volatile, in which case this volatilizing method cannot be applied thereto.

In addition, although there can be considered a method of extracting polymer compounds with a solvent different from the solvent for a polymer solution, it would be difficult to choose an appropriate solvent therefor, and a large amount of a solvent is used, involving a risk. Also, the procedures become complicated, requiring a step of removing remaining solvents from the polymer compounds, thereby making it impractical.

Also, a method of removing low-molecular impurities with an ultrafiltration membrane is disclosed in Japanese Patent Laid-Open No. Hei 3-66705 and Japanese Examined Patent Publication No. Hei 7-59609. These methods are directed to separation of the polymer compound from the low-molecular impurities by the difference in the sizes of the molecules of the polymer compound and the low-molecular impurities. According to these methods, the concentration of the remaining low-molecular impurities can be lowered to a given level without further using an extract other than the polymer solution. However, there arises a problem that a great deal of time is required for purification.

In addition, Japanese Patent Laid-Open No. Hei 8-217802 discloses a method for removing a low-molecular compound having a molecular weight of 10,000 or less and unreacted monomers from the ionic polymer compound with an ultrafiltration membrane. However, even in this method, there is exemplified a method of removing these components with concentrating the polymer concentration during treatment from 1% by weight to about 5% by weight. Therefore, there has yet remained a problem that filtration must be carried out after diluting to a considerably low concentration.

Apart from the above methods, a method of removing low-molecular impurities comprising unreacted monomers as a main component from the cationic polymer compound utilizing electrodialytic method is disclosed in Japanese Examined Patent Publication No. Hei 7-68298. However, in this electrodialytic method, the ionic substances having a low molecular weight are removed by flowing an electric current therethrough. Therefore, when the concentration of the ionic substances having a low molecular weight is in the range of less than 0.1%, the electric current which is allowed to send becomes extremely small, so that a great deal of time would be required for purification.

DISCLOSURE OF INVENTION

Accordingly, an object of the present invention is to provide a method for purification of an ionic polymer compound comprising efficiently removing low-molecular impurities, such as ionic remaining monomers, which are charged identically to the ionic polymer compound from the ionic polymer compound with a shorter period of time.

As a result of the studies, the present inventors have found that the low-molecular impurities having counter ions common with the ionic polymer compound can be efficiently removed by the use of an ultrafiltration membrane and/or a reverse osmosis membrane from an aqueous solution containing the ionic polymer compound and the low-molecular impurities which are charged identically to the ionic polymer compound, under conditions that the concentration of the ionic polymer compound is from 7 to 20% by weight, and that the amount of electric charges of the ionic polymer compound in the aqueous solution is 0.30 gram-equivalent/liter or more. The present invention has been completed based on this finding.

Specifically, in sum, the present invention pertains to:

[1] a method for purification of an ionic polymer compound, characterized by removing low-molecular impurities by the use of an ultrafiltration membrane and/or a reverse osmosis membrane from an aqueous solution containing the ionic polymer compound and low-molecular impurities which are charged identically to the ionic polymer compound, under conditions that a concentration of the ionic polymer compound is from 7 to 20% by weight, and that an amount of charges of the ionic polymer compound in the aqueous solution is 0.30 gram-equivalent/liter or more;

[2] the method for purification of an ionic polymer compound according to item [1] above, characterized in that an amount of charges possessed by the ionic polymer compound in the aqueous solution is 3.0 gram-equivalent/kg or more;

[3] the method for purification of an ionic polymer compound according to item [1] above, characterized in that 60% by weight or more of solvents constituting the aqueous solution is water;

[4] the method for purification of an ionic polymer compound according to item [1] above, characterized in that the ultrafiltration membrane or reverse osmosis membrane is a ceramic filter;

[5] the method for purification of an ionic polymer compound according to item [1] above, characterized in that an average pore size of the ultrafiltration membrane or reverse osmosis membrane is from 4 to 100 nm;

[6] the method for purification of an ionic polymer compound according to item [1] above, characterized in that the ionic polymer compound has a weight-average molecular weight of 5,000 or more, and the low-molecular impurities have a molecular weight of 500 or less;

[7] the method for purification of an ionic polymer compound according to item [1] above, characterized in that the ionic polymer compound is a cationic polymer compound;

[8] the method for purification of an ionic polymer compound according to item [7] above, characterized in that the cationic polymer compound is synthesized from a cationic monomer which is a quaternary ammonium salt; and

[9] a method for purification of an ionic polymer compound characterized in that after purification of an ionic polymer compound by the use of the method for purification according to item [1] above, the ionic polymer compound is brought into contact with an ion exchange resin.

BEST MODE FOR CARRYING OUT THE INVENTION

The ionic polymer compound usable in the present invention will be explained hereinbelow. The dissociating group of the ionic polymer compound is not particularly limited, as long as the dissociating group is a group that forms a salt in the presence of an acid or base. The dissociating group may be any of anionic, cationic, or amphoteric group. For instance, in the preparation of the cationic polymer compound, in many cases cationic monomers with odors remain in the resulting reaction mixture, so that such a dissociating group is suitably used from the viewpoint of giving improved odors for the cationic polymer compound. Concrete examples of the salt-forming group includes carboxyl group, sulfonic acid residual group, sulfuric acid residual group, phosphoric acid residual group, nitric acid residual group, amino group, ammonium group, and the like. Two or more of these groups may be contained in one compound.

Concrete examples of the above polymer compounds include, for instance, natural or semisynthesized polymers, including mucopolysaccharides, such as hyaluronic acid, sodium hyaluronate, and sodium chondroitin sulfate; and hemi-celluloses, such as alginic acid, sodium alginate, ammonium alginate, a sodium salt of carboxymethyl cellulose, and carboxymethyl amylose, but synthesized polymers are more preferable. The synthesized polymer includes, for instance, those prepared from polymerizing one or more of the monomers listed below; or copolymers prepared from these monomers with another general monomer which has no salt-forming group, the general monomer including vinyl esters of aliphatic carboxylic acids such as vinyl acetate; (meth)acrylic esters such as methyl methacrylate; alkyl vinyl ethers such as methyl vinyl ether; N-vinyl cyclic amides such as N-vinylpyrrolidone; styrene and alkyl-substituted styrenes, and the like, and mixtures of these polymers.

As the anionic monomer, there can be exemplified the following monomers: Unsaturated carboxylic acid monomers, such as acrylic acid (AA), methacrylic acid (MA), maleic acid, and itaconic acid, acid anhydrides thereof, and salts thereof; unsaturated sulfonic acid monomers, such as styrenesulfonic acid and 2-acrylamido-2-methylpropanesulfonic acid (AMPS), or salts thereof; and unsaturated phosphoric acid monomers, such as vinylphosphonic acid and acid phosphoxyethyl (meth)acrylate.

As the cationic monomer, there can be exemplified the following monomers: (Meth)acrylic acid esters or (meth)acrylamides, each having a dialkylamino group, such as dimethylaminoethyl acrylate (DMAEA), dimethylaminoethyl methacrylate (DMAEMA), dimethylaminopropyl acrylamide (DMAPAAm), and dimethylaminopropyl methacrylamide (DMAPMAAm); styrenes each having a dialkylamino group, such as dimethylaminostyrene (DMASt) and dimethylaminomethylstyrene (DMAMSt); vinylpyridines, such as 4-vinylpyridine and 2-vinylpyridine; or quaternary ammonium salts thereof obtained from treating with a known quaternalizing agent, such as a halogenated alkyl, a halogenated benzyl, an alkylsulfonic or arylsulfonic acid, or a dialkylsulfate, to produce an ammonium salt.

As the amphoteric monomer, there can be exemplified the following monomers: N-(3-Sulfopropyl)N-acroyloxyethyl-N,N-dimethylammonium betaine, N-(3-sulfopropyl)-N-methacroylamidepropyl-N,N-dimethylammonium betaine, N-(3-carboxymethyl)-N-methacroylamidepropyl-N,N-dimethylammonium betaine, N-(3-sulfopropyl)-N-methacroyloxyethyl-N,N-dimethylammonium betaine, and N-carboxymethyl-N-methacroyloxyethyl-N,N-dimethylammonium betaine.

Incidentally, when the salt-forming group of these polymer compounds is not ionized, there can be used the salt-forming group which is neutralized with a known acid including, for instance, an inorganic acid, such as hydrochloric acid or sulfuric acid; or an organic acid, such as acetic acid, propionic acid, lactic acid, succinic acid, or glycolic acid, or with a base including, for instance, tertiary amines, such as trimethylamine or triethylamine; or ammonia, sodium hydroxide, or the like, whereby the salt-forming group of the polymer compounds is ionized.

The concentration of the ionic polymer compound in the aqueous solution in the present invention is from 7 to 20% by weight, more preferably from 9 to 18% by weight, particularly preferably from 10 to 15% by weight. When the concentration of the ionic polymer compound is lower than 7% by weight, the amount of the ionic polymer compound which can be treated per unit purification time becomes lowered. Also, since the amount of charges in the aqueous solution is lowered, the purification efficiency is lowered. When the amount of the ionic polymer compound exceeds 20% by weight, the ionic polymer compound can be purified with a smaller amount of the filtrate. However, since the viscosity is too high, the amount of the filtrate permeated is lowered, so that the purification time is rather made long.

Further, it is desired that the amount of charges of the ionic polymer compound in the aqueous solution is 0.30 gram-equivalent/liter or more, more preferably 0.4 gram-equivalent/liter or more, particularly preferably 0.5 gram-equivalent/liter or more. When the amount of charges of the ionic polymer compound in the treated aqueous solution is less than 0.30 gram-equivalent/liter, the action mechanism of the purification method described below is considered not to function sufficiently, so that the low-molecular impurities cannot be efficiently removed.

In addition, it is desired that the amount of charges per unit weight of the ionic polymer compound per se is 3.0 gram-equivalent/kg or more, more preferably 5.0 gram-equivalent/kg or more. When the amount of charges of the ionic polymer compound per se is lowered, there may be some cases where the effects of the present invention cannot be sufficiently obtained.

The weight-average molecular weight of the ionic polymer compound usable in the present invention is desirably from 5,000 to 1,500,000 or so. When the weight-average molecular weight is less than 5,000, it would be difficult to separate the low-molecular impurities by the use of a membrane. In addition, when the weight-average molecular weight exceeds 1,500,000, the viscosity of the aqueous solution containing the ionic polymer compound becomes too high, so that the amount of the aqueous solution permeated is lowered, thereby consequently requiring a great deal of time for purification.

The ultrafiltration membrane or reverse osmosis membrane usable in the present invention is a membrane which is capable of separating the low-molecular impurities from the ionic polymer compound by substantially permeating the low-molecular impurities such as remaining monomers, without permeating the ionic polymer compound, wherein a membrane having the optimal average pore size can be selected depending upon the molecular weight of the ionic polymer compound to be separated. Preferably those membranes having an average pore size of from 4 to 100 nm, particularly preferably from 10 to 50 nm, can be used. When the average pore size is less than 4 nm, the permeation of the low-molecular impurities is inhibited, and thereby the amount of the permeating solution per unit area is lowered in some cases. In addition, when the average pore size exceeds 100 nm, the permeation inhibition ratio of the ionic polymer compound is lowered. For this reason, those matching the above conditions can be arbitrarily selected among the commercially available membranes.

In addition, there can be suitably used an ultrafiltration membrane in a case where the weight-average molecular weight of the ionic polymer compound used in the present invention is 10,000 or more, or a reverse osmosis membrane in a case where the weight-average molecular weight is less than 10,000.

The ultrafiltration membrane in the present invention is not particularly limited, any one can be used as long as it has fine pores and is capable of permeating molecules of the low-molecular impurities, such as ionic remaining monomers, which are charged identically to the ionic polymer compound. The material for forming the above ultrafiltration membrane includes, for instance, organic polymer compounds, such as polyethersulfones, polysulfones, polyvinyl alcohols, polyamides, polyvinylidene fluorides, and polytetrafluoroethylenes; and inorganic materials such as porous glass and ceramics.

In addition, the reverse osmosis membranes have been originally used in the separation of inorganic ions by producing fresh water from seawater or desalting industrial water by inhibiting the permeation of low-molecular compounds such as NaCl. As the reverse osmosis membrane used for the purpose of desalting as mentioned above, those membranes having a permeation inhibition ratio of NaCl of 95% or more have been used. Recently, however, membranes having the permeation inhibition ratio of NaCl of from 10 to 50% have been made commercially available. These membranes have characteristics of permeating the low-molecular compounds such as salt, without permeating the polymer compounds of a given size or more. In other words, when using a reverse osmosis membrane of which the permeation inhibition ratio of NaCl of from 10 to 50%, the ionic polymer compound can be separated from the ionic low-molecular compounds. The material for forming the above reverse osmosis membrane includes, for instance, polysulfones, polyvinyl alcohols, cellulose acetate, and the like. As the reverse osmosis membrane having the above permeation inhibition ratio, there can be used "SU-600" (trade name, manufactured by Toray Industries, Inc.), "NTR1550" (trade name, manufactured by NITTO DENKO CORPORATION), and the like.

The separator equipped with the ultrafiltration membrane or reverse osmosis membrane may have any form for either ultrafiltration or reverse osmosis, and there may be applicable various separators of flat membrane, spiral, tubular, hollow fiber, or vibrating forms.

In this case, higher the permeation inhibition ratio of the ionic polymer compound, the better. If a membrane having a small pore size is selected, the permeation inhibition ratio becomes high, while the permeation flow rate is rather lowered, so that the purification time becomes long in some cases. In order to obtain a high permeation inhibition ratio and a high level of the permeation flow rate, since it is appropriate to use a membrane having a narrow pore size distribution, generally, a ceramic filter of which the pore size distribution is so-called sharp is preferably used.

The method for purification comprising removing the low-molecular impurities with a membrane is not particularly limited. The method for purification includes concentration method, diafiltration method where water is added in an equivolume to as the filtrate permeated, and the like. In addition, there may be preferably employed a method where concentration and dilution are repeated several times, or a combined method of concentration method and diafiltration method.

Among them, when purification is carried out by the diafiltration method, the concentration of the ionic polymer compound during treatment can be preferably kept at an optimal concentration level for purification.

The low-molecular impurities, such as remaining monomers, as referred to in the present specification may be those which are charged identically to the subject ionic polymer compound, whereby the low-molecular impurities can be effectively removed by the method of the present invention. Concrete examples of the above low-molecular impurities include remaining polymerizable monomers; oligomers having a low degree of polymerization or salts of degradation products of polymerization initiators; polymerization inhibitors contained in raw material monomers, and the like. It is desired that the molecular weight of the low-molecular impurities is 500 or less. When the molecular weight is too high, it would be difficult to separate the ionic polymer compound with the low-molecular impurities by means of a membrane.

The polymerization initiator includes, for instance, general water-soluble polymerization initiators, including azo water-soluble polymerization initiators, such as 2,2'-azobis(2-amidinopropane)dihydrochloride, 2,2'-azobis(2-(5-methyl-2-imidazolin-2-yl)propane)dihydrochloride, 2,2'-azobis(2-(2-imidazolin-2-yl)dihydrochloride, and 2,2'-azobis(2-methylbutane amideoxime)dihydrochloride; polymerization initiators such as potassium persulfate, ammonium persulfate, and sodium persulfate. The polymerization inhibitor includes hydroquinone, p-methoxyphenol, and the like.

In the present invention, the ionic polymer compound which is purified as described above may be further purified by a contact treatment with an ion exchange resin. By this purification step, the low-molecular impurities which are charged identically to the ionic polymer compound can be efficiently removed at a low concentration.

The ion exchange resin which can be used in the present invention includes cation exchange resins and anion exchange resins. These ion exchange resins may be used alone or in a combination thereof.

As the cation exchange resin, there can be used strongly acidic cation exchange resins and weakly acidic cation exchange resins. The strongly acidic cation exchange resin includes, for instance, a resin of which exchange group is sulfonic acid group, and the like. Concrete examples thereof include DIAION SKLB, SK104, SK110, SK112, SK116, PK208, PK212, PK216, PK220, PK228, and HPK25 (trade names, manufactured by Mitsubishi Chemical Corporation); AMBERLITE IR-120B, IR-124, 200C, 201B, 252, and IR-118 (trade names, manufactured by Organo Corporation), and the like. The weakly acidic cation exchange resin includes, for instance, methacrylic acid-based and acrylic acid-based ion exchange resins, of which exchange group is a carboxylic acid group. Concrete examples thereof DIAION WK10, WK11, WK100, WK01S, and WK40 (trade names, manufactured by Mitsubishi Chemical Corporation); AMBERLITE IRC-50 and IRC-76 (trade names, manufactured by Organo Corporation), and the like. When the pH of the solution containing the ionic polymer compound is lower than 8, it is desirable to use a strongly acidic cation exchange resin with which ion exchanging can be carried out in the entire pH region. When the pH of the solution containing the ionic polymer compound is 8 or higher, it is desirable to use a weakly acidic cation exchange resin which has a large total exchange capacity of ions and is easily regenerated.

As the anion exchange resin, there can be used strongly basic anion exchange resins and weakly basic anion exchange resins. The strongly basic anion exchange resin includes, for instance, a resin of which exchange group is quaternary ammonium group, and the like. Concrete examples thereof include DIAION SA10A, SA11A, SA12A, NSA100, SA20A, SA21A, PA308, PA312, PA316, PA408, PA412, PA418, HPA25, and HPA75 (trade names, manufactured by Mitsubishi Chemical Corporation); AMBERLITE IRA-400, IRA-400T, IRA-401, IRA-402, IRA-402BL, IRA-410, IRA-411S, IRA-440B, IRA-458, IRA-900, IRA-904, IRA-910, and IRA-958 (trade names, manufactured by Organo Corporation), and the like. The weakly basic anion exchange resin includes, for instance, a resin of which exchange group is primary to tertiary amines. Concrete examples thereof DIAION WA10, WA20, WA21J, and WA30 (trade names, manufactured by Mitsubishi Chemical Corporation); AMBERLITE IRA-35, IRA-60E, IRA-68, IRA-93ZU, and IRA-94S (trade names, manufactured by Organo Corporation), and the like.

When the pH of the solution containing the ionic polymer compound is 5 or higher, it is desirable to use a strongly basic anion exchange resin with which ion exchanging can be carried out in the entire pH region. When the pH of the solution containing the ionic polymer compound is lower than 5, it is desirable to use a weakly basic anion exchange resin which has a large total exchange capacity of ions and is easily regenerated.

In the present invention, in a case where the ion exchange resin is regenerated when the ion exchange resin is used, the ion exchange resin is used after subjecting it to a general regeneration treatment. Specifically, the regeneration of each of the ion exchange resins is carried out by filling a vessel of each of the ion exchange resins and treating the ion exchange resin with an aqueous solution of hydrochloric acid or sulfuric acid before use, in a case of a cation exchange resin of non-H forms, such as those having Na forms; or with an aqueous sodium hydroxide before use, in a case of an anion exchange resin of non-OH forms, such as those having Cl forms; and thereafter washing with desalted water.

In the present invention, when the regenerated ion exchange resin is used, either of batch-type and columnar type may be used according to its purposes. The operating conditions are such that in a batch type the cation or anion exchange resin is added in an amount of one equivalence or more of the exchange group based on the ionic impurities contained in the polymer solution, and the mixture is stirred for 0.1 to 10 hours or so, and thereafter the mixture is filtered to remove the ion exchange resin.

In the case of columnar type, either of circulation method or flow method may be employed. The flow rate is not particularly limited. For instance, it is preferable that the flow rate and the amount of the ion exchange resin are set under such conditions that space velocity (=[flow rate ($m^3$/hour)]/[amount of resin $m^3$]) is 1 $Hr^{-1}$ or more for the circulation method, and that the space velocity is 100 $Hr^{-1}$ or less for the flow method. In addition, in consideration of the strength of the ion exchange resin, it is desired to have a flow rate which can be operated with a differential pressure between the resin layers in the above range of space velocities of 1 MPa or less.

The volume of the column is preferably from 1.2 times to 5 times the volume of the resin, in consideration of swelling shrinkage of the resin, regeneration of the resin, and washing operability.

In addition, a method where the cation exchange resin is used together with the anion exchange resin includes mixed bed purification method where the cation exchange resin and the anion exchange resin are used as a mixture, purification method where each of the cation exchange resin and the anion exchange resin is packed in separate vessels or columns for each treatment.

The solution containing the ionic polymer compound and the low-molecular impurities subject for purification in the present invention is an aqueous solution, where water is used as a solvent. However, an organic solvent, such as methanol, ethanol, isopropyl alcohol, or acetone, may be contained in the aqueous solution in an amount so as not to impair the dissociation of the ionic polymer compound and the low-molecular impurities. However, even in cases where an organic solvent other than water is contained therein, it is desired that the proportion of water in the solvents is 60% by weight or more, particularly preferably 80% by weight or more. When the content of water in the solvent is lower than 60% by weight, since the degree of dissociation of the ionic polymer compound is lowered, the amount of charges in the treating aqueous solution of the ionic polymer compound is lowered, and thereby the effects of the present invention cannot be sufficiently obtained.

In cases where the degree of dissociation of the ionic polymer compound differs depending upon its pH, it is desirable to adjust its pH so as to have a higher degree of dissociation.

The action mechanism of the method for purification of the present invention is not definite, and it is deduced to be as follows. Specifically, in general, the low-molecular compounds which can permeate through the membrane permeate at the same concentration as a retentate (treatment solution). Likewise in the present invention, in a case where the ionic polymer compounds which cannot permeate through the membrane are present in the aqueous solution and the counter ions of such ionic polymer compounds are permeable, the counter ions of the ionic polymer compounds would be attempted to permeate through the membrane at the same concentration as the mother liquor (treatment solution). Since electric neutrality must be maintained in the aqueous solution, the polymer compounds, which are the counter ions thereof, would also have to permeate at the same time. However, since the polymer compounds cannot permeate through the membrane as described above, the low-molecular compounds which are permeable and charged identically to the ionic polymer compound consequently permeate through the membrane. As a result, it is considered that the low-molecular compounds permeate at a higher concentration than a case where the low-molecular compounds alone permeate through the membrane. Based on the above, it is deduced that the effects of the present invention are remarkably exhibited in a case where the concentration of the ionic polymer compound is higher and the concentration of the counter ions of the ionic polymer compound is higher.

The present invention will be described in further detail by means of the following Examples and Comparative Examples, but the present invention is by no means limited to these Examples, and the like.

EXAMPLE 1

A 18% by weight aqueous solution of a cationic polymethacryloyloxyethyltrimethyl ammonium chloride was obtained by polymerization reaction. The amount of charges per unit weight possessed by this ionic polymer compound was 4.81 gram-equivalent/kg. At this time, the weight-average molecular weight of the ionic polymer compound was 220,000. The weight concentration of the remaining monomers on a solid basis was 1260 ppm. The molecular weight of the remaining monomers was 207.7. Incidentally, the weight concentration of the remaining monomers was determined by liquid chromatography.

To 10 kg of this aqueous solution was added 5 kg of ion-exchanged water to prepare a 12% by weight aqueous solution, and the aqueous solution was applied to an ultra-filtration device equipped with a ceramic filter (manufactured by TOSHIBA CERAMICS CO., LTD.; trade name "MEMBRALOX"), and purification of the ionic polymer compound was carried out. The amount of charges of the ionic polymer compound in the treated aqueous solution was 0.58 gram-equivalent/liter. The pore size of the ceramic filter was 10 nm, and the membrane area was 0.4 $m^{2}$.

The operation conditions were such that the diafiltration method where water was supplied in an equivolume to the filtrate permeated was carried out, wherein the circulation flow rate of the aqueous solution within the membrane was 1.2 m/s, the pressure at inlet of membrane module was 9.0 kgf/cm$^2$, and the pressure at outlet was 6.5 kgf/cm$^2$.

The changes with the passage of time during purification of concentrations of the remaining monomers on a solid basis in the treating aqueous solution and of the accumulative amounts of the filtrate are shown in Table 1. Further, concentrations of the remaining monomers on a solid basis in the treating aqueous solution which are theoretically calculated from the accumulative amounts of the filtrate are also given for the sake of comparison.

This theoretically calculated value is based on the following theoretical calculation used when purified according to diafiltration method:

$$C = Co \cdot e^{-V/Vs},$$

wherein V is an accumulative amount of the filtrate;

Vs is a total amount of the treated aqueous solution;

C is a concentration of the remaining monomers in the treated solution in the accumulative amount V of the filtrate; and Co is a concentration of the remaining monomers in the initial treatment solution.

TABLE 1

| Purification Time (hr) | Conc. of Remaining Monomers in Treated Aqueous Solution on Solid Basis (ppm) | Accumulated Amount of Filtrate (kg) | Theoretical Calculated Conc. of Remaining Monomers in Treated Aqueous Solution on Solid Basis (ppm) |
|---|---|---|---|
| 1.0 | 642 | 3.6 | 989 |
| 2.0 | 358 | 7.2 | 778 |
| 3.0 | 192 | 10.7 | 616 |
| 4.0 | 100 | 14.0 | 495 |

EXAMPLE 2

The same purification procedures as in Example 1 were carried out except that 10 kg of ion-exchanged water was added to 10 kg of a 18% by weight aqueous solution of a polymethacryloyloxyethyltrimethyl ammonium chloride, to prepare a 9% by weight aqueous solution. The amount of charges of the ionic polymer compound in the treated aqueous solution was 0.43 gram-equivalent/liter. The results are shown in Table 2.

TABLE 2

| Purification Time (hr) | Conc. of Remaining Monomers in Treated Aqueous Solution on Solid Basis (ppm) | Accumulated Amount of Filtrate (kg) | Theoretical Calculated Conc. of Remaining Monomers in Treated Aqueous Solution on Solid Basis (ppm) |
|---|---|---|---|
| 1.0 | 825 | 5.1 | 975 |
| 2.0 | 483 | 10.3 | 751 |
| 3.0 | 298 | 16.1 | 562 |
| 4.0 | 235 | 21.5 | 429 |
| 5.0 | 170 | 27.0 | 326 |

EXAMPLE 3

The same purification procedures as in Example 1 were carried out except that 2 kg of ion-exchanged water was added to 10 kg of a 18% by weight aqueous solution of a polymethacryloyloxyethyltrimethyl ammonium chloride, to prepare a 15% by weight aqueous solution. The amount of charges of the ionic polymer compound in the treated aqueous solution was 0.72 gram-equivalent/liter. The results are shown in Table 3.

TABLE 3

| Purification Time (hr) | Conc. of Remaining Monomers in Treated Aqueous Solution on Solid Basis (ppm) | Accumulated Amount of Filtrate (kg) | Theoretical Calculated Conc. of Remaining Monomers in Treated Aqueous Solution on Solid Basis (ppm) |
|---|---|---|---|
| 1.0 | 733 | 1.6 | 1101 |
| 2.0 | 430 | 3.2 | 963 |
| 3.0 | 285 | 4.8 | 843 |
| 4.0 | 195 | 6.3 | 744 |

EXAMPLE 4

The treated aqueous solution obtained after two hours of the same purification procedures as in Example 1 (15 kg of a 12% by weight aqueous solution; concentration of the remaining monomers on a solid basis: 358 ppm; pH: 5.6) was supplied through a column (diameter: 70 mm; length: 780 mm) packed with 1.2 liters of strongly acidic cation exchange resin ("SKlB," manufactured by Mitsubishi Chemical Corporation) at a flow rate (liquid gravity: 1.01) of 15 kg/hr (space velocity: 12.4 Hr$^{-1}$). The concentration of the remaining monomers in the resulting treated aqueous solution on a solid basis was 29 ppm.

EXAMPLE 5

The treated aqueous solution obtained after three hours of the same purification procedures as in Example 2 (20 kg of a 9% by weight aqueous solution; concentration of the remaining monomers on a solid basis: 298 ppm; pH: 5.7) was supplied through the same column packed with the ion exchange resin in the same manner as in Example 4 at a flow rate of 20 kg/hr (space velocity: 16.5 Hr$^{-1}$). The concentration of the remaining monomers in the resulting treated aqueous solution on a solid basis was 31 ppm.

EXAMPLE 6

The treated aqueous solution obtained after two hours of the same purification procedures as in Example 3 (12 kg of a 15% by weight aqueous solution; concentration of the remaining monomers on a solid basis: 430 ppm; pH: 5.5)

was supplied through the same column packed with the ion exchange resin in the same manner as in Example 4 at a flow rate of 12 kg/hr (space velocity: 9.9 Hr$^{-1}$). The concentration of the remaining monomers in the resulting treated aqueous solution on a solid basis was 30 ppm.

EXAMPLE 7

The amount 15 kg of a 12% by weight aqueous solution of a polydimethylaminoethyl methacrylate hydrochloride was obtained by polymerization reaction. The amount of charges per unit weight possessed by this ionic polymer compound was 5.16 gram-equivalent/kg. At this time, the weight-average molecular weight of the ionic polymer compound was 230,000. The weight concentration of the remaining monomers on a solid basis was 1320 ppm. The molecular weight of the remaining monomers was 193.72. Incidentally, the weight concentration of the remaining monomers was determined by liquid chromatography. The purification of this ionic polymer compound was carried out by the same procedures as in Example 1. The amount of charges of the ionic polymer compound in the treated aqueous solution was 0.62 gram-equivalent/liter. The results are shown in Table 4.

TABLE 4

| Purification Time (hr) | Conc. of Remaining Monomers in Treated Aqueous Solution on Solid Basis (ppm) | Accumulated Amount of Filtrate (kg) | Theoretical Calculated Conc. of Remaining Monomers in Treated Aqueous Solution on Solid Basis (ppm) |
|---|---|---|---|
| 1.0 | 697 | 3.3 | 1059 |
| 2.0 | 368 | 6.6 | 850 |
| 3.0 | 195 | 9.9 | 682 |
| 4.0 | 107 | 13.0 | 555 |

EXAMPLE 8

The amount 22.5 kg of a 8% by weight aqueous solution of sodium polyacrylate was obtained by polymerization reaction. The amount of charges per unit weight possessed by this ionic polymer compound was 10.64 gram-equivalent/kg. At this time, the weight-average molecular weight of the ionic polymer compound was 230,000. The weight concentration of the remaining monomers on a solid basis was 1008 ppm. The molecular weight of the remaining monomers was 94.05. Incidentally, the weight concentration of the remaining monomers was determined by liquid chromatography. The purification of this ionic polymer compound was carried out by the same procedures as in Example 1. The amount of charges of the ionic polymer compound in the treated aqueous solution was 0.85 gram-equivalent/liter. The results are shown in Table 5.

TABLE 5

| Purification Time (hr) | Conc. of Remaining Monomers in Treated Aqueous Solution on Solid Basis (ppm) | Accumulated Amount of Filtrate (kg) | Theoretical Calculated Conc. of Remaining Monomers in Treated Aqueous Solution on Solid Basis (ppm) |
|---|---|---|---|
| 1.0 | 707 | 5.7 | 782 |
| 2.0 | 478 | 12.0 | 591 |
| 3.0 | 337 | 17.6 | 461 |
| 4.0 | 235 | 23.4 | 356 |

COMPARATIVE EXAMPLE

The same purification procedures as in Example 1 were carried out except that 35 kg of ion-exchanged water was added to 10 kg of a 18% by weight aqueous solution of a polymethacryloyloxyethyltrimethyl ammonium chloride, to prepare a 4% by weight aqueous solution. The amount of charges of the ionic polymer compound in the treated aqueous solution was 0.19 gram-equivalent/liter. The results are shown in Table 6.

TABLE 6

| Purification Time (hr) | Conc. of Remaining Monomers in Treated Aqueous Solution on Solid Basis (ppm) | Accumulated Amount of Filtrate (kg) | Theoretical Calculated Conc. of Remaining Monomers in Treated Aqueous Solution on Solid Basis (ppm) |
|---|---|---|---|
| 1.0 | 1148 | 8.4 | 1043 |
| 2.0 | 905 | 17.6 | 850 |
| 3.0 | 625 | 25.0 | 722 |

It is clear from Tables 1 to 6 that in Examples 1 to 3 and Examples 7 and 8, the concentrations of the remaining monomers in the resulting treated aqueous solution are remarkably reduced as compared to the theoretically calculated ones, so that the remaining monomers in the treated aqueous solution are efficiently removed in a short period of time.

On the other hand, in a case where the concentration of the ionic polymer compound in the aqueous solution is low and the amount of charges is lower than 0.30 gram-equivalent/liter as in Comparative Example, the concentration of the remaining monomers in the resulting treated aqueous solution is found to be of the same level as that of the theoretically calculated one, so that no effects of the present invention have been found.

In addition, it is clear from the results of Examples 4 to 6 that the concentration of the remaining monomers in each treated aqueous solution on a solid basis can be further reduced and the remaining monomers are efficiently removed by supplying each of the treated aqueous solution obtained in Examples 1 to 3 to a column packed with a strongly acidic cation exchange resin to allow contact treatment with the ion exchange resin.

Industrial Applicability

According to the method for purification of the ionic polymer compound of the present invention, there can be exhibited an effect that the low-molecular compounds can be efficiently removed for purification from the ionic polymer compound in a shorter period of time than conventional ones by purifying by the use of an ultrafiltration membrane and/or a reverse osmosis membrane the aqueous solution containing the ionic polymer compound and the low-molecular impurities which are charged identically to the ionic polymer compound, such as ionic remaining monomers, under given conditions.

What is claimed is:

1. A method for purification of an ionic polymer compound, characterized by removing low-molecular impurities by the use of an ultrafiltration membrane and/or a reverse osmosis membrane from an aqueous solution containing the ionic polymer compound and low-molecular impurities, under conditions that a concentration of the ionic polymer compound is from 7 to 20% by weight, and that an amount of charges of the ionic polymer compound in the aqueous solution is 0.30 gram-equivalent/liter or more.

2. The method for purification of an ionic polymer compound according to claim 1, characterized in that an amount of charges possessed by the ionic polymer compound in the aqueous solution is 3.0 gram-equivalent/kg or more.

3. The method for purification of an ionic polymer compound according to claim 1, wherein the aqueous solution comprises water and a solvent; and 60% by weight or more of the aqueous solution is water.

4. The method for purification of an ionic polymer compound according to claim 1, characterized in that the ultrafiltration membrane or reverse osmosis membrane is a ceramic filter.

5. The method for purification of an ionic polymer compound according to claim 1, characterized in that an average pore size of the ultrafiltration membrane or reverse osmosis membrane is from 4 to 100 nm.

6. The method for purification of an ionic polymer compound according to claim 1, characterized in that the ionic polymer compound has a weight-average molecular weight of 5,000 or more, and the low-molecular impurities have a molecular weight of 500 or less.

7. The method for purification of an ionic polymer compound according to claim 1, characterized in that the ionic polymer compound is a cationic polymer compound.

8. A method for purification of an ionic polymer compound characterized in that after purification of an ionic polymer compound by the use of the method for purification according to claim 1, the ionic polymer compound is brought into contact with an ion exchange resin.

9. The method of claim 1, wherein said ionic polymer compound forms a salt in the presence of an acid or base.

10. A method for purification of an ionic polymer compound comprising removing low-molecular weight impurities by the use of an ultrafiltration membrane and/or a reverse osmosis membrane from an aqueous solution containing the ionic polymer compound and low-molecular impurities, under conditions that the concentration of the ionic polymer compound is from 7 to 20% by weight, and the amount of charge of the ionic polymer compound in the aqueous solution is 0.30 gram-equivalent/liter or more;

wherein the ionic polymer compound is a cationic polymer; and wherein the cationic polymer is prepared from a quaternary ammonium salt.

* * * * *